(12) United States Patent
Zolotow et al.

(10) Patent No.: US 10,929,118 B2
(45) Date of Patent: Feb. 23, 2021

(54) COGNITIVE MICROCODE SIMULATION, PLANNING, AND RISK ASSESSMENT

(71) Applicant: International Business Machines Corporation, Armonk, NY (US)

(72) Inventors: Clea A. Zolotow, Key West, FL (US); Mihai Criveti, Blanchardstown (IE); Andrew P. Barnes, Greystones (IE); Gavin C. O'Reilly, Kilcoole (IE); Marci D. Formato, Clintondale, NY (US); Jørgen E. Floes, Stenløse (DK); Tedrick N. Northway, High Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/206,102

(22) Filed: Nov. 30, 2018

(65) Prior Publication Data
US 2020/0174769 A1 Jun. 4, 2020

(51) Int. Cl.
*G06F 9/44* (2018.01)
*G06F 8/65* (2018.01)
*G06F 16/21* (2019.01)

(52) U.S. Cl.
CPC .............. *G06F 8/65* (2013.01); *G06F 16/219* (2019.01)

(58) Field of Classification Search
None
See application file for complete search history.

(56) References Cited

U.S. PATENT DOCUMENTS

| | | | |
|---|---|---|---|
| 2009/0006070 A1* | 1/2009 | Sasatani | G06F 8/61 703/22 |
| 2011/0289499 A1* | 11/2011 | Haubold | G06F 8/65 717/173 |
| 2015/0220423 A1* | 8/2015 | Kraus | G06F 11/3684 717/135 |
| 2017/0322871 A1* | 11/2017 | Tran | G06F 11/3664 |
| 2018/0046476 A1* | 2/2018 | Baughman | G06F 9/50 |
| 2018/0077224 A1* | 3/2018 | Moon | G06F 11/3409 |
| 2018/0144243 A1* | 5/2018 | Hsieh | G06N 3/0454 |
| 2018/0210436 A1 | 7/2018 | Burd | |
| 2018/0302303 A1* | 10/2018 | Skovron | G06F 11/0793 |
| 2018/0337983 A1* | 11/2018 | Li | H04L 41/12 |

(Continued)

FOREIGN PATENT DOCUMENTS

WO 2018132112 A1 7/2018

OTHER PUBLICATIONS

"Cisco UCS Manager Firmware Management Guide, Release 3.1", Cisco, Updated Jul. 26, 2018, 28 pages, <https://www.cisco.com/c/en/us/td/docs/unified_computing/ucs/ucs-manager/GUI-User-Guides/Firmware-Mgmt/3-1/o_UCSM_GUI_Firmware_Management_Guide_3_1/b_UCSM_GUI_Firmware_Management_Guide_3_1_chapter_01.html#concept_5DC93029588F4CD799430114672E315D>.

(Continued)

*Primary Examiner* — Insun Kang
(74) *Attorney, Agent, or Firm* — Grant M. McNeilly

(57) ABSTRACT

A method includes creating a digital twin that represents a computing infrastructure, the digital twin representing all microcode versions present in components in the computing infrastructure. The method further includes creating a database of a plurality of upgrades including at least one microcode version update and a corresponding criticality of each of the plurality of updates and emulating a first deploy- (Continued)

ment of a first set of one or more of the plurality of updates with the digital twin.

17 Claims, 9 Drawing Sheets

(56) References Cited

U.S. PATENT DOCUMENTS

| | | | | |
|---|---|---|---|---|
| 2019/0018671 | A1* | 1/2019 | Zhu | G06F 8/60 |
| 2019/0129700 | A1* | 5/2019 | Subramaniyan | G06F 8/60 |
| 2019/0130121 | A1* | 5/2019 | Birn | G06F 16/211 |
| 2019/0130326 | A1* | 5/2019 | Carley | G06F 11/3442 |
| 2019/0149617 | A1* | 5/2019 | Gao | G06F 8/60 |
| | | | | 709/223 |
| 2019/0163547 | A1* | 5/2019 | Ampabathina | G06F 11/0709 |
| 2019/0272224 | A1* | 9/2019 | Woods | G06F 9/455 |
| 2019/0303118 | A1* | 10/2019 | Avinash Dorle | G06F 8/77 |
| 2019/0361797 | A1* | 11/2019 | Yerli | G06F 11/3672 |
| 2019/0391866 | A1* | 12/2019 | Ampabathina | H04L 67/10 |
| 2020/0110691 | A1* | 4/2020 | Bryant | G06F 8/60 |
| 2020/0117447 | A1* | 4/2020 | Catalano | H04L 41/5045 |

OTHER PUBLICATIONS

"Integrated Management Module User's Guide", IBM Knowledge Center, last printed Sep. 28, 2018, 2 pages, <https://www.ibm.com/support/knowledgecenter/en/STAV45/com.ibm.sonas.doc/imm_iug.html>.

"Pareto efficiency", Wikipedia, last edited on Aug. 30, 2018, 8 pages, <https://en.wikipedia.org/wiki/Pareto_efficiency>.

"Probabilistic Graphical Models", © 2018 Coursera, 7 pages, <https://www.coursera.org/specializations/probabilistic-graphical-models?siteID=.YZD2vKyNUY-N0MeKNzBZIkjUs7CyIpDvg>.

Ammermann, Dirk, "Digital Twins and the Internet of Things (IoT)", Sep. 9, 2017, 8 pages, <https://blogs.sap.com/2017/09/09/digital-twins-and-the-internet-of-things-iot/>.

Anaby Tavor, Ateret, "Making the right choice with IBM Watson Tradeoff Analytics", Watson Dev, Updated on Apr. 9, 2015, 6 pages, <https://developer.ibm.com/watson/blog/2015/02/16/making-right-choice-ibm-watson-tradeoff-analytics/>.

Engblom, Jakob, "Simulation Plays in the Gartner Top Ten Tech Trends for 2018", Intel® Software Developer Zone, published on Feb. 2, 2018, 8 pages, <https://software.intel.com/en-us/blogs/2018/02/02/simulation-plays-in-the-gartner-top-ten-tech-trends-for-2018>.

Marom, Shim, "Project Risk Management and the application of Monte Carlo Simulation", quantmleap, Jul. 8, 2010, 8 pages, <http://quantmleap.com/blog/2010/07/project-risk-management-and-the-application-of-monte-carlo-simulation/>.

Mell et al., "The NIST Definition of Cloud Computing", National Institute of Standards and Technology, Special Publication 800-145, Sep. 2011, 7 pages.

Mihai, Criveti, "GNS3—Cisco Virtual Lab with Dynampis, Dynagen, Idle-PC, PEmu", Cloud Architecture and Technology Blog, Friday, Mar. 21, 2008, 6 pages, <http://blog.boreas.ro/2008/03/gns3-cisco-virtual-lab-with-dynampis.html>.

Saran, Cliff, "Digital twins: Revolutionising product businesses", ComputerWeekly.com, Copyright 2000-2018, TechTarget, 6 pages, <https://www.computerweekly.com/feature/Digital-twins-Revolutionising-product-businesses>.

\* cited by examiner

COGNITIVE MICROCODE SIMULATION, PLANNING, AND RISK ASSESSMENT

BACKGROUND

Many modern computing infrastructures include heterogeneous software and hardware resources and assets. For example, a single infrastructure can include different hardware servers, virtual machines, application servers, databases, load balancers, operating systems, middleware, and software applications. In addition, the computing resources can exist at a data center, in a cloud computing environment, or a combination thereof (i.e., a hybrid environment).

The computing resources/assets can include microcode software. Microcode is a computer hardware operating technique that imposes an interpreter between the CPU hardware and the programmer-visible instruction set architecture of the computer. As such, the microcode is a layer of hardware-level instructions that implement higher-level machine code instructions or internal state machine sequencing in many digital processing elements. As with any software, updates (including upgrades) to the microcode can be issued. Installation of the microcode can affect the computing resource that it is associated with, which in turn can affect how that computing resource/asset interacts with other computing resources/assets.

SUMMARY

According to some embodiments of the present disclosure, a method includes creating a digital twin that represents a computing infrastructure, the digital twin representing all microcode versions present in components in the computing infrastructure. The method further includes creating a database of a plurality of upgrades including at least one microcode version update and a corresponding criticality of each of the plurality of updates and emulating a first deployment of a first set of one or more of the plurality of updates with the digital twin.

According to some embodiments of the present disclosure, a computing environment includes a computing infrastructure including microcode, a digital twin that reflects the computing infrastructure and the microcode in real-time, and a dashboard configured to display information about the computing infrastructure and the microcode in real-time.

According to some embodiments of the present disclosure, a computer program product for memory management, the computer program product including a computer readable storage medium, the computer readable storage medium having program instructions embodied therewith, the programs instructions configured, when executed by at least one computer, to cause the at least one computer to perform a method. The method includes creating a digital twin that represents a computing infrastructure, the digital twin representing all microcode versions present in components in the computing infrastructure. The method further includes creating a database of a plurality of upgrades including at least one microcode version update and a corresponding criticality of each of the plurality of updates and emulating a first deployment of a first set of one or more of the plurality of updates with the digital twin.

DETAILED DESCRIPTION

Unfortunately, microcode updates in computing infrastructures (such as data centers) can present many problems. For example, the updates can be bi-directional, which can require that microcode in different devices be updated concurrently. This can exponentially increase the level of risk of an issue arising due to the update. Oftentimes, microcode updates cannot be rolled back, so if they are unsuccessful, they can produce downtime for critical applications. Even if rollback is possible, it may be disruptive to the operability of portions of the computing infrastructure and/or cause downtime.

Traditionally, microcode updates are not planned out in a systematic fashion, and the risks of the updates are not analyzed systematically. While a microcode software vendor may verify that an update to one product does not cause issues with its other products, incompatibility with other vendors' products may be left uninvestigated and unknown. Even if there is a desire to systematically test the compatibility of an update across an entire multi-domain and interconnected environment, such testing may not be feasible. Furthermore, in the situation where there are multiple different updates to perform, the best logical and physical order to apply them has not traditionally been ascertained beforehand.

As will be shown and discussed henceforth in the present disclosure, a digital twin can be used to assist with the implementation of microcode updates.

Figure 1:
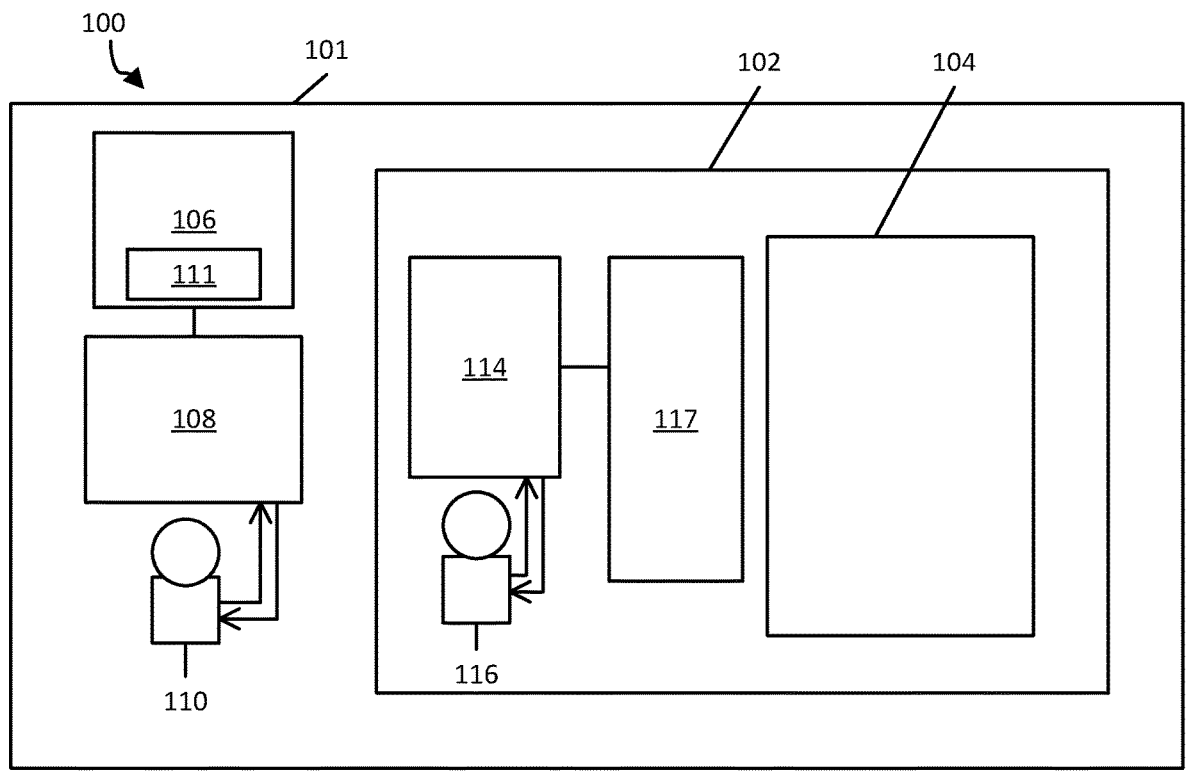
FIG. 1 shows a visual representation of some of the responsibilities and relationships of the equipment and personnel in a computing infrastructure according to an embodiment of the present disclosure.

FIG. 1 shows a visual representation of some of the responsibilities and relationships of the equipment and personnel in computing infrastructure 100. In the illustrated embodiment, infrastructure 100 includes resource/asset domain 101, information technology (IT) applications/software domain 102, and application release domain 104. Resource/asset domain 101 encompasses IT applications/software domain 102 and application release domain 104, and IT applications/software domain 102 encompasses application release domain 104.

Resource/asset domain 101 includes the hardware resources 106 in computing infrastructure 100. Resource/asset domain 101 includes resource/asset management system 108 with which infra administrator 110 can interact, for example, to update hardware microcode 111 in hardware resources 106.

IT applications/software domain virtual machines 102 on the operating system level that are used in computing infrastructure 100. IT applications/software domain 102 includes IT applications/software management system 114, and platform administrator 116 can interact with IT applications/software management system 114, for example, to update VM microcode 117 in IT applications/software domain virtual machines 102.

Figure 2:
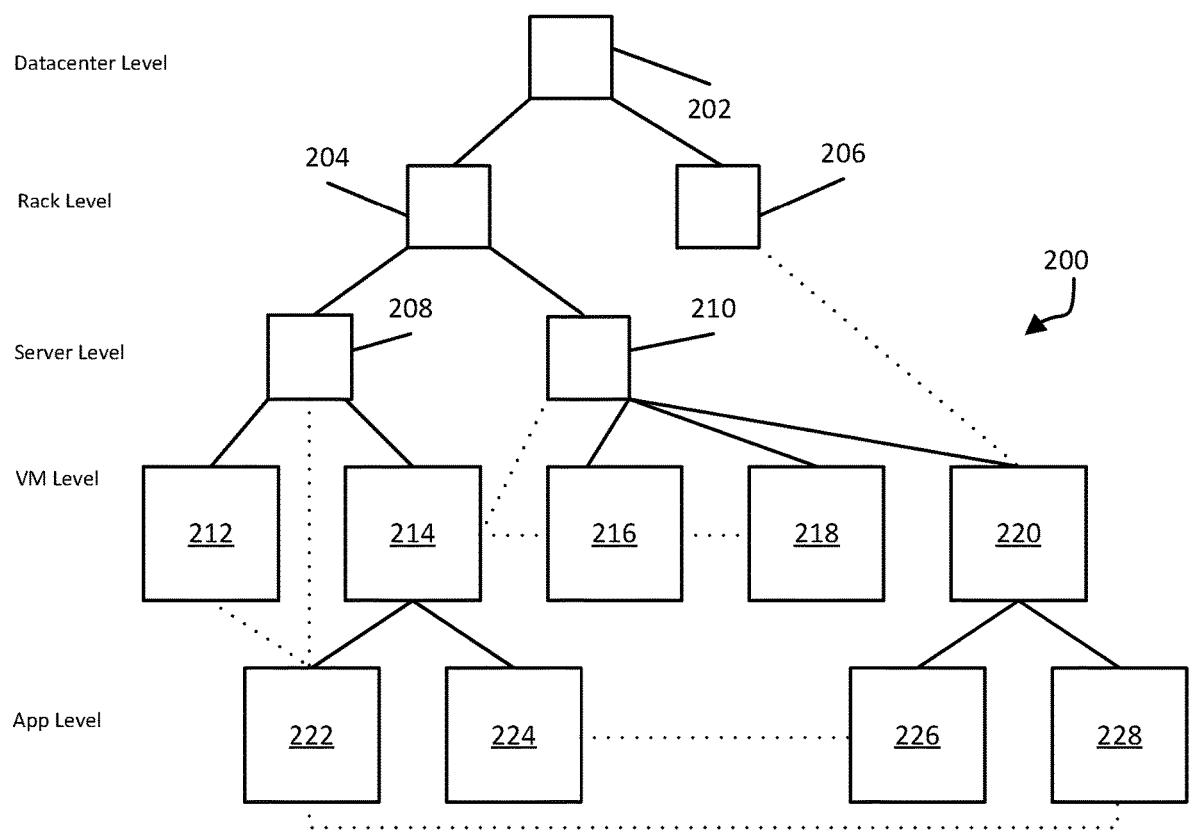
FIG. 2 shows a hierarchical representation of a computing infrastructure according to an embodiment of the present disclosure.

FIG. 2 shows a hierarchical representation of (at least a portion of) computing infrastructure 200. Computing infrastructure 200 can be similar to or the same as computing infrastructure 100 (shown in FIG. 1). FIG. 2 graphically demonstrates exemplary lines of communication that some of the resources/assets have with other resources/assets in some embodiments of computing infrastructure 200. More specifically, when a resource/asset receives an update (including or alternatively, an upgrade), other resources/assets can be affected due to their communication with and/or reliance on the updated resource/asset.

In the illustrated embodiment, the computing infrastructure 200 comprises datacenter 202; racks 204 and 206; servers 208 and 210; virtual machines 212, 214, 216, 218, and 220; and applications 222, 224, 226, and 228. According to the hierarchy, applications 222-228 are dependent on virtual machine 214 and 220, respectively, and virtual machines 212-220 are dependent on servers 208 and 210, respectively. In turn, servers 208 and 210 are dependent on rack 204, and racks 204 and 206 are dependent on datacenter 202.

However, despite the dependencies, communication and reliance between the different resources/assets of computing infrastructure 200 can flow down, up, and/or across the hierarchy. Some examples of such communication are shown by phantom lines between resources/assets in FIG. 2. Thereby, changes to the microcode of any resource/asset can potentially cause an issue within computing infrastructure 200 due to, for example, an incompatibility of communication between two resources/assets.

Figure 3:
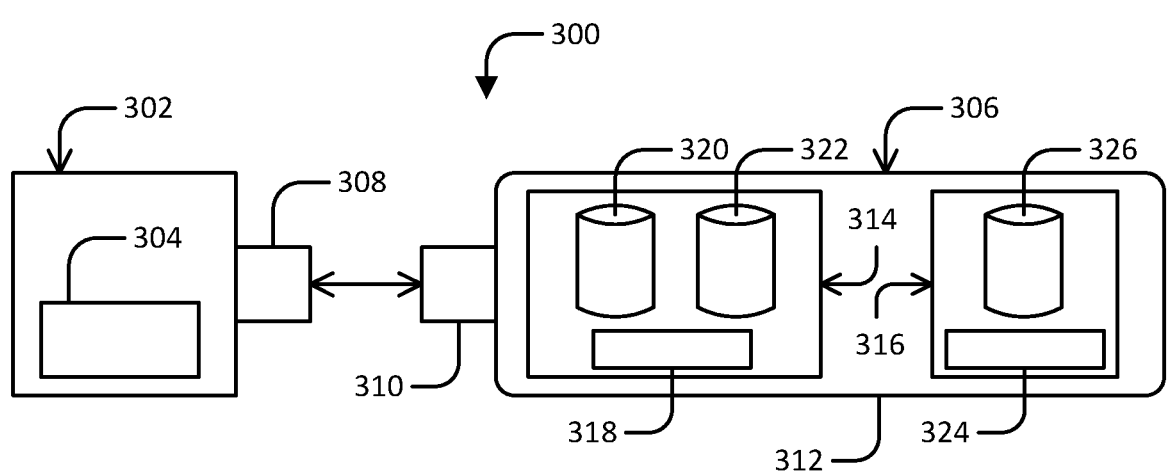
FIG. 3 shows one line of communication between resources/assets in a computing infrastructure according to an embodiment of the present disclosure.

Shown in FIG. 3 is one line of communication 300 between resources/assets in a computing infrastructure, such as computing infrastructure 100 and/or computing infrastructure 200 (shown in FIGS. 1 and 2, respectively). In the illustrated embodiment, hypervisor 302 includes processor 304, and hypervisor 302 is communicatively connected to storage area network (SAN) 306 via network interface controller (NIC) 308 and port 310. SAN 306 includes fabric 312, device 314, and device 316. Device 314 includes processor 318 and storage drives 320 and 322, and device 316 includes processor 324 and storage drive 326.

In some embodiments, each of hypervisor 302, SAN 306, NIC 308, port 310, fabric 312, device 314, and device 316 can include microcode. In some embodiments, the microcode is developed by a plurality of vendors. As a result of line of communication 300, the different microcode software can indirectly interact with each other. Thereby, some level of compatibility with one another should be present in order to ensure proper functioning of line of communication 300.

Figure 4:
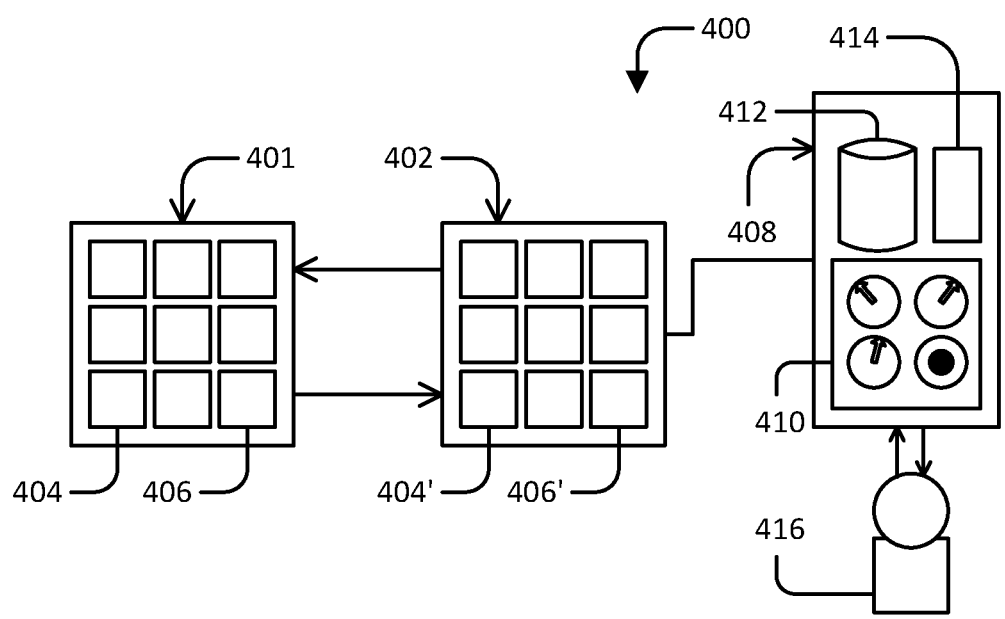
FIG. 4 shows a computing environment including a digital twin of a computing infrastructure according to an embodiment of the present disclosure.

Shown in FIG. 4 is computing environment 400 which includes computing infrastructure 401 and digital twin 402. Computing infrastructure 401 can be similar to or the same as computing infrastructure 100 and/or computing infrastructure 200 (shown in FIGS. 1 and 2, respectively). In the illustrated embodiment, digital twin 402 is a digital replica of the actual assets, processes, and systems of computing infrastructure 401. For example, computing infrastructure 401 includes server 404 and virtual machine (VM) 406, so digital twin 402 includes twin server 404' and twin VM 406'.

In the illustrated embodiment, computing environment 400 further includes computing system 408 with dashboard 410 which is a dynamic visual representation of digital twin 402. Because digital twin 402 contains real-time, live, up-to-date information collected from computing infrastructure 401, dashboard 410 is also a dynamic visual representation of computing infrastructure 401. Dashboard 410 can display information such as power and usage thereof, memory and usage thereof, communication bandwidth and usage thereof, and temperature and cooling. Computing system 408 can also store this data in database 412 to create an accessible historical record, which can be displayed on dashboard 410. In addition, dashboard 410 can display an overall system status, for example, using the colors red (non-operational/unavailable), amber (partially operational/somewhat available), and green (fully operational/available).

Computing system 408 also includes emulation software that makes the resources/assets in digital twin 402 behave the same as the resources/assets in computing infrastructure 401. Dashboard 410 includes processor 414 to run the emulation software. This allows user 416 to monitor the current and past operation of digital twin 402 and/or computing infrastructure 401 and to simulate potential future conditions in computing infrastructure 401 using digital twin 402. Examples of commercially-available emulation software includes QEMU (an open-source product), Simics® (from Wind River® Systems), SIMH (from Bob Supnik at the Computer History Simulation Project), and Hercules System (an open-source product).

In some embodiments, to create digital twin 402 (which can accurately reflect the microcode software present in computing infrastructure 401), database 412 is set up to include information about all of the hardware, software, microcode, firmware, and operating system (OS) versions that are employed in computing infrastructure 401 (which can exist, for example, in the form of a rack layout, not shown). For example, database 412 includes information about the hardware, software, microcode, firmware, and OS versions of server 404 and VM 406, which is associated with twin server 404' and twin VM 406', respectively. Database 412 further includes information about current updates that can be implemented along with their corresponding criticality. For example, an OS patch to fix a potential security issue can be rated as mandatory, while a functionality upgrade to a VM can be rated as optional.

In addition, database 412 can include historical update tickets that reflect past updates and any impacts they had on computing infrastructure 401 and/or digital twin 402 during or after their implementation. For example, an incompatibility between one provider's upgrade and another provider's product can be recorded in database 412. Likewise, this data can be used to build a compatibility matrix that includes information about which microcode versions are compatible with which other microcode versions, OSs, devices, etc. This data can be gathered from computing infrastructure 401, digital twin 402, and/or entered (or modified) by user 416. This historical data can be used to extrapolate, analyze, and determine whether an update should be deployed, so there is cognitive machine learning capability within computing environment 400. The historical data can be utilized to suggest a different update type or firmware version. Historical data can be scanned to look at the model and type (i.e., the hardware model and its particular version) and see, historically, how successful the upgrades were.

Because digital twin 402 is an emulated environment representing computing infrastructure 401, digital twin 402 can be used to simulate updates to computing infrastructure 401. Thereby, user 416 can deploy an update in digital twin 402, and if it creates a problem with the operability of digital twin 402, then computing infrastructure 401 will not be affected. In case there is more than one update available, digital twin 402 can be used to determine the different orders of deploying the updates and evaluate each one. This can be useful since it may be helpful for the compatibility of the updates and/or because there can be concurrency issues (e.g., there may not be enough resources and/or personnel to deploy all of the updates simultaneously).

If an update or series of updates are deployed in digital twin 402, digital twin 402 can be rolled back to a state before the update(s) was/were deployed. Thereby, different deployment scenarios can be established wherein different sequences of updates can be tested, and the best order can be determined for deploying the updates, based on, for example, compatibility, risk, and/or criticality. This capability can also be used to determine the best physical path of deploying the update(s) in computing infrastructure 401 in case the update(s) has/have a hardware component. Similarly, if an/some update(s) need to be rolled back in computing system 401 (for example, due to an unforeseen incompatibility), digital twin 402 can be used to determine a way and/or the best way to do that.

Whether the update(s) is/are tested and the order in which they are deployed can be informed by the historical data in database 412. For example, the historical data can be used to determine the compatibility and/or risk of an update in light of the current conditions (e.g., OS versions, providers of microcode, etc.) of computing infrastructure 401 and digital twin 402.

The components and configuration of computing environment 400 allow for updates (such as microcode updates) to be planned, analyzed systematically, and assessed, for example, for compatibility, risk, and/or criticality. These activities can be performed under the past, present, or future conditions in computing infrastructure 401, and the activities can be performed across some or all of computing infrastructure 401, regardless of the provider of the various resources/assets therein. Thereby, the best logical and physical paths to apply the updates can be ascertained, which prevents downtime in computing infrastructure 401 and conserves the computing and personnel resources that would otherwise be required to deal with problems resulting from non-optimal update deployment.

Figure 5:
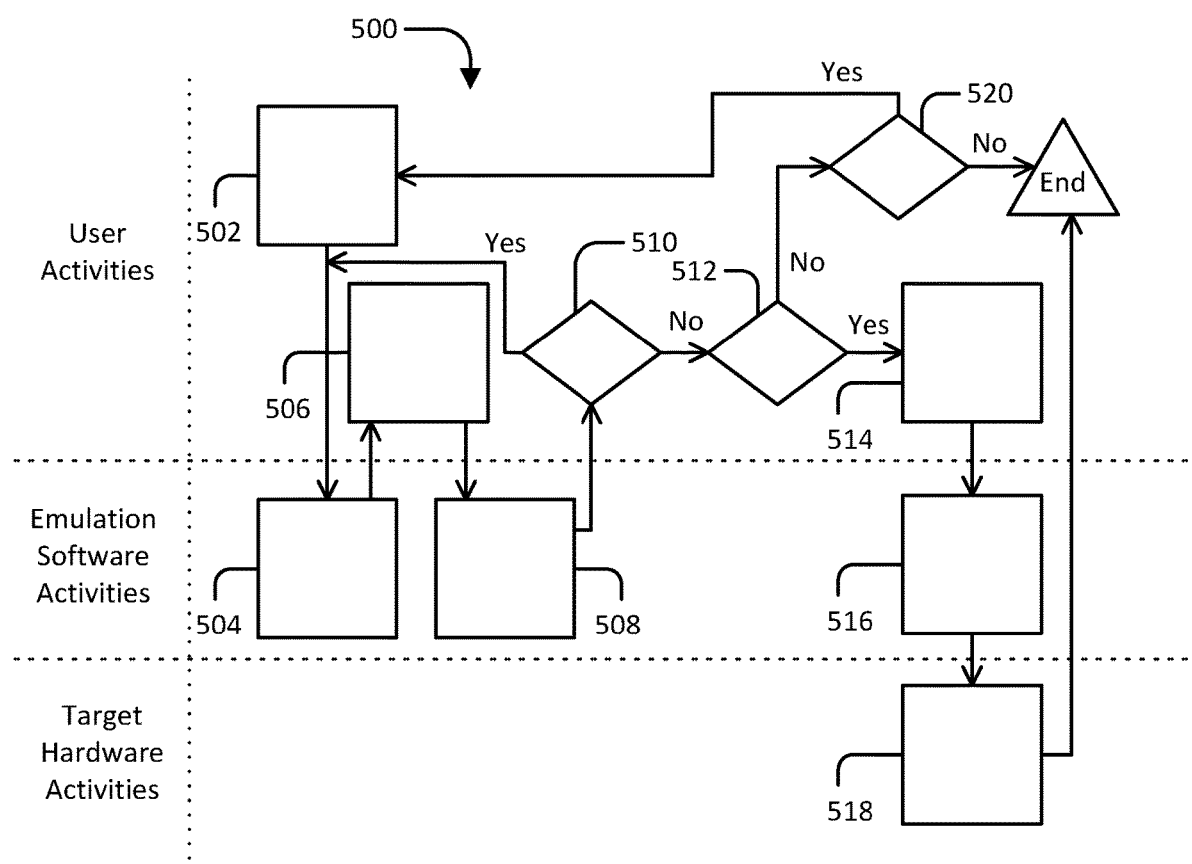
FIG. 5 shows a flowchart of a method of using the digital twin according to an embodiment of the present disclosure.

Shown in FIG. 5 is a flowchart of method 500 of using digital twin 402 of FIG. 4. At box 502, computing system 408 receives a proposed software (e.g., microcode) update, for example, from user 416. In addition or in the alternative, computing system 408 periodically queries the vendor about proposed software updates; computing system 408 receives the proposed software update from a curated database of software updates; or computing system 408 receives the proposed software update from the vendor of the software. At box 504, the emulation software in computing system 408 receives the proposed software update(s) and prepares a first deployment to be simulated.

At box 506, computing system 408 receives an instruction to start the emulation software, for example, utilizing Pareto guidelines or another analysis method. At box 508, the emulation of the first deployment is performed, for example, by doing a plain end-to-end check to see if the software upgrade would result in an operational computing infrastructure 401. At box 510, the results of the emulation are reviewed, which can occur, for example, within computing system 408 automatically. Alternatively or concurrently, the results can be output to user 416 for review. During the review, computing system 408 and/or user 416 determines if there are other viable options based on, for example, historical data and/or the criticalities of the updates. If there is at least one deployment remaining that has not been attempted but should be, then method 500 returns to box 504 wherein the emulation software receives one of these alternate deployments. The alternate deployment(s) may include a different order of updates and/or may include fewer updates, for example, if at least one of the updates is optional.

If there are no additional deployments to simulate, then method 500 moves on to box 512. Here the successful simulated update deployments are judged to determine if any of them are acceptable, and, optionally, which deployment is the best. The judgement can be performed by computing system 408 automatically and/or by user 416. If the judgement is performed by user 416, then computing system 408 sends the deployment options to user 416 and receives an indication of which deployment to use from user 416.

Once an acceptable update deployment has been selected, at box 514, the software upgrade(s) is/are released. At box 516, for example, computing system 408 retrieves the update(s) and connects with computing infrastructure 401. At box 518, computing system 408 transmits the update(s) to the resource(s)/asset(s) that the update(s) is/are intended for according to the selected deployment. Upon receipt, the resource(s)/asset(s) accept(s) the update(s) and computing system 408 can receive a message of acknowledgement of receipt of the update(s) and/or a message of successful updating therefrom. Thereafter, method 500 ends.

If no acceptable update deployment is found at box 512, then method 500 moves to box 520. At box 520, if there is alternate software (e.g., microcode) that can be used in place of one, some, or all of the mandatory updates, then the alternate software is incorporated into a new update proposal at box 502. This can occur, for example, by computing system 408 searching for alternate software or by computing system 408 receiving alternate software from user 416. If there is no alternate software available, then method 500 ends without an update being deployed at that time.

A factor in the decision at box 512 can be how much risk that the proposed update deployment poses. In some embodiments, a risk rating is calculated by computing system 408 and/or user 416 based on the aggregate component change. If an application is faced by an increasing number of changes, then the action is exponentially riskier (not merely additively riskier). Therefore, a risk rating can be assigned based on, for example, the impact to computing infrastructure 401 (e.g., the number of systems affected by the change). The impact can have a multiplier applied thereto that can reflect one or more variables of computing infrastructure 401 (or the resources/assets therein). Examples of such variables are the total number of components (e.g., software, firmware, and hardware in computing infrastructure 401); the age of the system (either as a whole or the updating component(s)); whether there is a third-party support contract for the system or components thereof; whether a rolling update can be employed; whether the system has configuration redundancy (e.g., if multi-path communication possible between affected devices and the quality thereof); the importance of maintaining operability of computing infrastructure 401 (or certain components thereof), and historical data related to a number of past updates (either as a whole or of like kind, wherein the multiplier increases with an increasing number of past updates). An example of the historical data is used would be to review the success of last update to a particular component, although this factor may drop out if there have not been any updates to that component yet. A review of historical data can also reveal empirical workarounds that have been employed in past updates in order to make the process more successful.

These risk factors can be used to perform a Pareto analysis of risk of a proposed update. The analysis can be scalar Pareto or it can be a multi-variate analysis using Monte Carlo (which may require a range of each input), hidden Markov chains, and/or probabilistic graphical model specialization. Such analysis techniques would be known to a person having ordinary skill in the art.

Thereby, computing environment 400 and method 500 can be used to dynamically simulate end-to-end, multi-component updates where some of the updates are mandatory and others are optional. In addition, the best order and/or path for updating computing infrastructure 401 can be discovered automatically, along with any dependencies that may be present (i.e., updates that should/shall be performed after other updates). On the contrary, if there is no safe way to update computing infrastructure 401 at the time of analysis, computing environment 400 will also discover that automatically.

Figure 6:
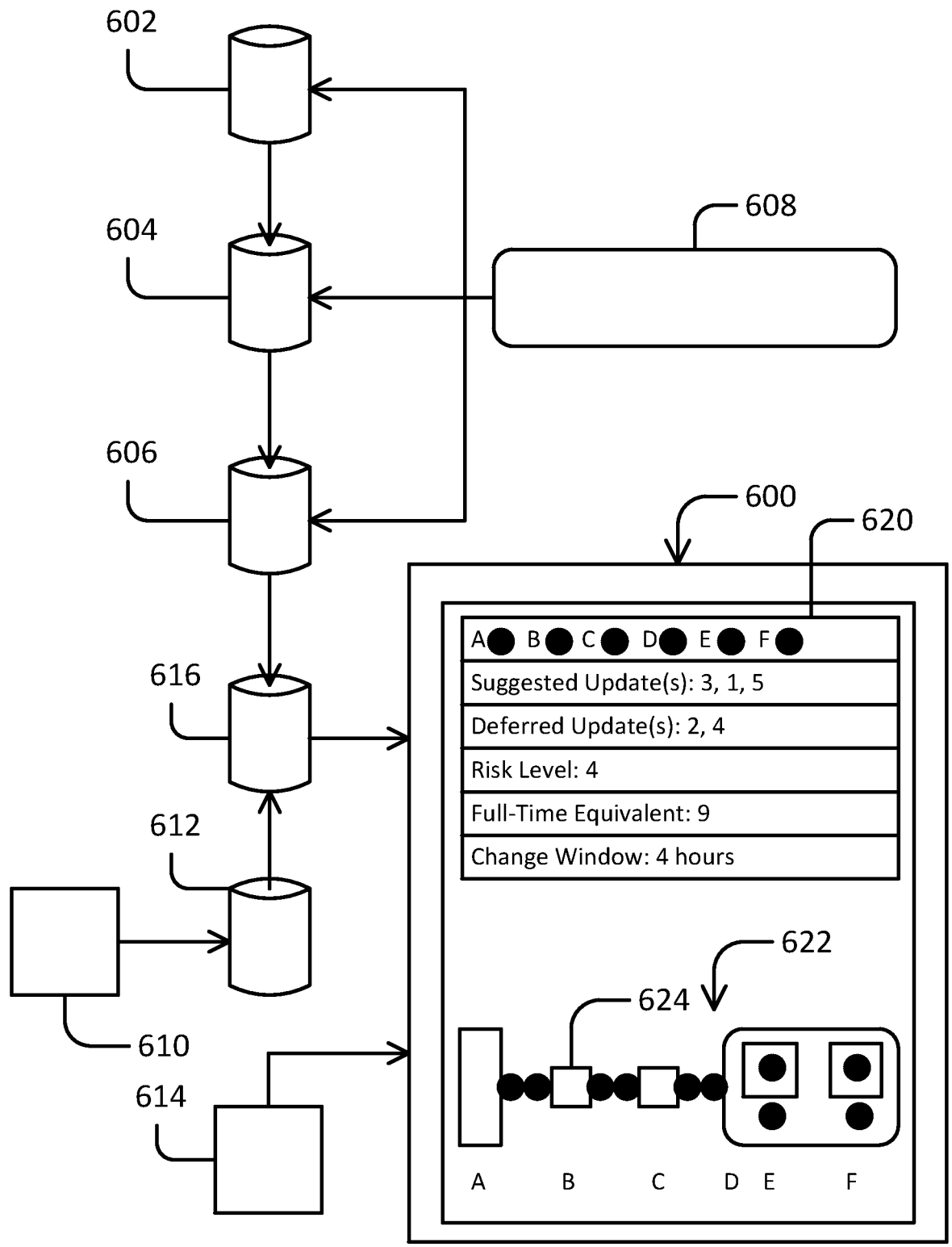
FIG. 6 shows a schematic view of inputs and outputs of a computing system according to an embodiment of the present disclosure.

Shown in FIG. 6 is a schematic view of inputs and outputs of computing system 600. Computing system 600 can be similar to or the same as computing system 408 (shown in FIG. 4). In the illustrated embodiment, the inputs to computing system 600 include: hardware model and type (stored in hardware database 602), microcode/firmware version (stored in microcode database 604), and software OS and drivers (stored in software database 606). Databases 602, 604, and 606 can be updated in real-time due to their connections to computing infrastructure 608. Computing infrastructure 608 can be similar to or the same as computing infrastructure 100, computing infrastructure 200, and/or computing infrastructure 401 (shown in FIGS. 1, 2, and 4, respectively).

In the illustrated embodiment, the inputs further include the verified (e.g., check-summed) updates 610 (stored in update database 612) along with known compatibility data and the knowledge and resources of the users/vendors (e.g., people database 614) associated or involved with the updates, the inputs, computing system 600, and/or computing infrastructure 608. In addition, the machine experience learned from past updates that resides (and is updated) in computing system 600 will also be utilized as an input. These inputs can help keep digital twin 616 up-to-date in real-time. Digital twin 616 can be similar to or the same as digital twin 402 (shown in FIG. 4).

In the illustrated embodiment, the real-time outputs of computing system 600 can be shown in table 620 and diagram 622 on dashboard 618. Dashboard 618 can be similar to or the same as dashboard 410 (shown in FIG. 4). These outputs can include: the statuses of the components of line of communication 624 (which can be similar to or the same as line of communication 300, shown in FIG. 3); the suggested updates to do, listed in the best order/path in which to do them; the deferred updates to do at a later time; the risk level of performing the update deployment; the estimated full-time equivalent (FTE), which is a measure of the amount of labor it will take to deploy the updates; and the estimated change window time, which is a measure of how long it will take the components to receive and install the updates. In addition, computing system can have other outputs (not shown), such as the status/progress of the updates; the best date/time to deploy the updates; the rolling update path (if possible); any known issues and workarounds, based on historical data; the risk level of deferring updates; and the backout plan in case a rollback may be performed (if possible).

In the illustrated example, dashboard 618 shows that hypervisor (A), NIC (B), port (C), fabric (D), and devices (E and F) are functioning and communicating properly. Computing system 600, utilizing a Pareto analysis, has considered updates 1-5 and has suggested updates in the order of 3,1, and 5 with deferment of updates 2 and 4. Computing system 600 has factored in the importance of the components to be updated (from information in databases 602, 604, and 606), that some of the updates are mandatory (from information in update database 612), and the update histories of the effected components. Therefore, a risk level of 4 has been assigned. From information in people database 614 and the criticality of the upgrades, computing system 600 estimates that the deployment will utilize four technicians, and three project staff to run phones, as well as two people ready to accept turnover if the change goes over eight hours. However, based on historical data, computing system 600 estimates that the updates should only take four hours to deploy. From there a user, such as user 416 (shown in FIG. 4), can determine whether to deploy the updates and if so, when to deploy the updates (such as in box 514, shown in FIG. 5).

The components, configuration, and operation of the present disclosure, including that shown and discussed with respect to FIGS. 1-6, allow for multi-domain microcode updates to be simulated when some of the updates are optional. Thereby, the updates can be modeled, the risk of the different possible update combinations or orders can be calculated, and the users can be trained on performing the deployment (e.g., the user can deploy the updates in digital twin prior to deploying the updates in the computing infrastructure). In addition, the user can monitor the status of an update through the dashboard since the digital twin is a real-time reflection of the computing infrastructure.

Figure 7:
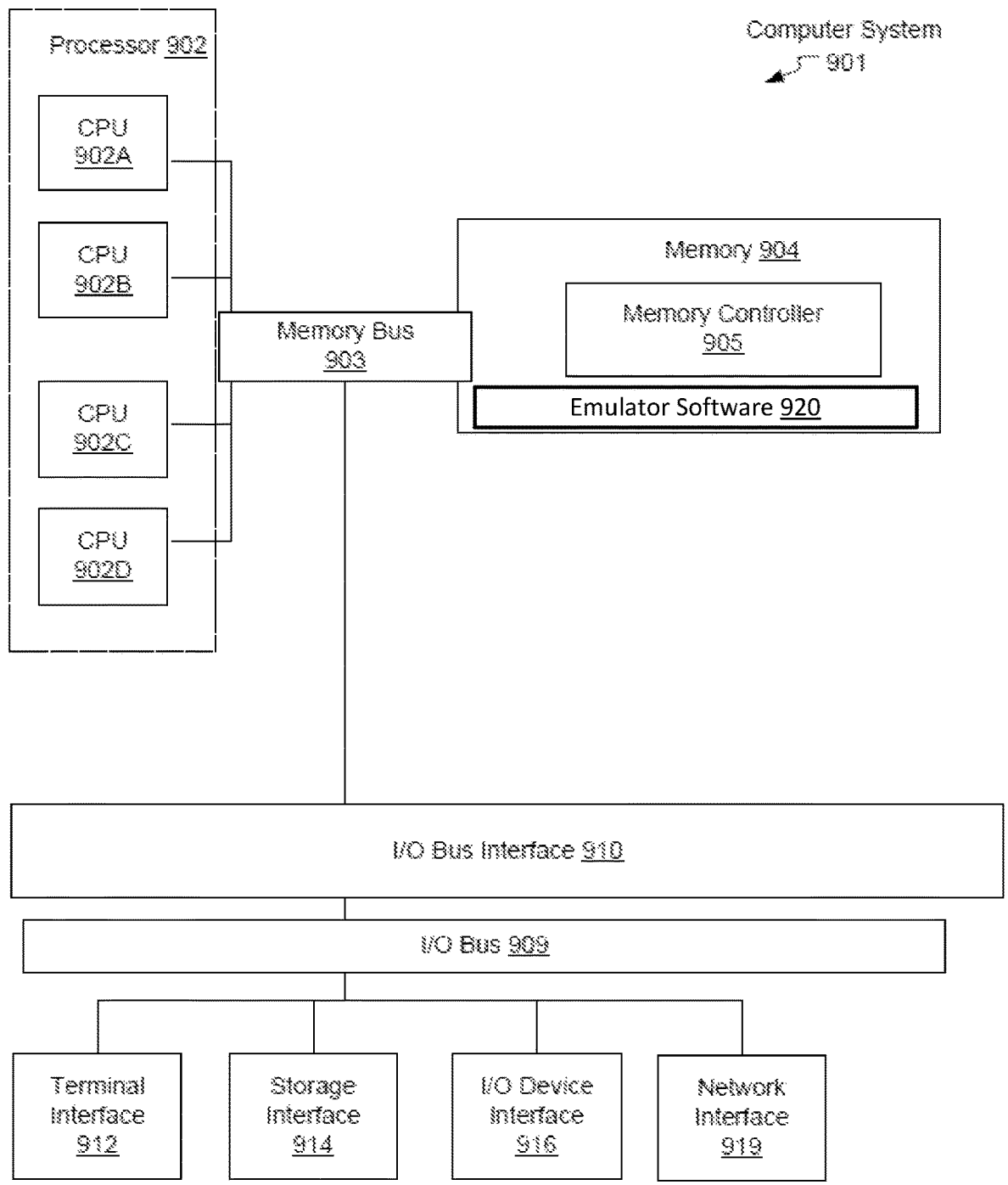
FIG. 7 shows a high-level block diagram of an example computer system that may be used in implementing embodiments of the present disclosure.

Referring now to FIG. 7, shown is a high-level block diagram of an example computer system (i.e., computer) 901 that may be used in implementing one or more of the methods or modules, and any related functions or operations, described herein (e.g., using one or more processor circuits or computer processors of the computer), in accordance with embodiments of the present disclosure. In some embodiments, the components of the computer system 901 may comprise one or more CPUs 902, a memory subsystem 904, a terminal interface 912, a storage interface 914, an I/O (Input/Output) device interface 916, and a network interface 919, all of which may be communicatively coupled, directly or indirectly, for inter-component communication via a memory bus 903, an I/O bus 909, and an I/O bus interface unit 910.

The computer system 901 may contain one or more general-purpose programmable central processing units (CPUs) 902A, 902B, 902C, and 902D, herein generically referred to as the processer 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may comprise one or more levels of on-board cache.

In some embodiments, the memory subsystem 904 may comprise a random-access semiconductor memory, storage device, or storage medium (either volatile or non-volatile) for storing data and programs. In some embodiments, the memory subsystem 904 may represent the entire virtual memory of the computer system 901 and may also include the virtual memory of other computer systems coupled to the computer system 901 or connected via a network. The memory subsystem 904 may be conceptually a single monolithic entity, but, in some embodiments, the memory subsystem 904 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 904 may contain elements for control and flow of memory used by the Processor 902. This may include a memory controller 905.

Although the memory bus 903 is shown in FIG. 7 as a single bus structure providing a direct communication path among the CPUs 902, the memory subsystem 904, and the I/O bus interface 910, the memory bus 903 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 909 are shown as single respective units, the computer system 901 may, in some embodiments, contain multiple I/O bus interface units 910, multiple I/O buses 909, or both. Further, while multiple I/O interface units are shown, which separate the I/O bus 909 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface but receives requests from other computer systems (clients). Further, in some embodiments, the computer system 901 may be implemented as a desktop computer, portable computer, laptop or notebook computer, tablet computer, pocket computer, telephone, smart phone, mobile device, or any other appropriate type of electronic device.

In the illustrated embodiment, memory subsystem 904 further includes emulator software 920. The execution of emulator software 920 enables computer system 901 to perform one or more of the functions described above in using digital twin 402 (for example, method 500, shown in FIG. 5).

It is noted that FIG. 7 is intended to depict representative components of an exemplary computer system 901. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
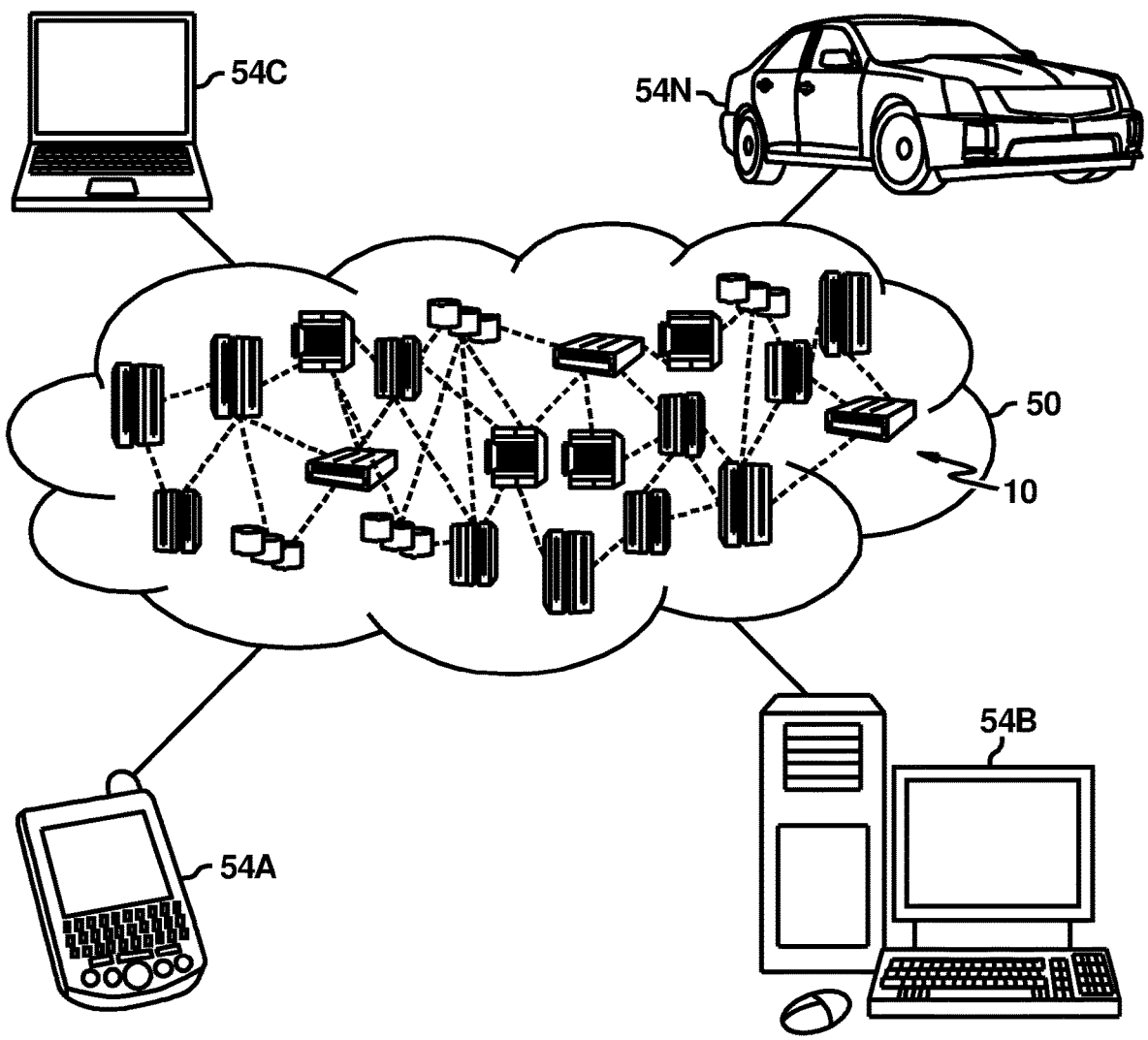
FIG. 8 depicts a cloud computing environment according to an embodiment of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
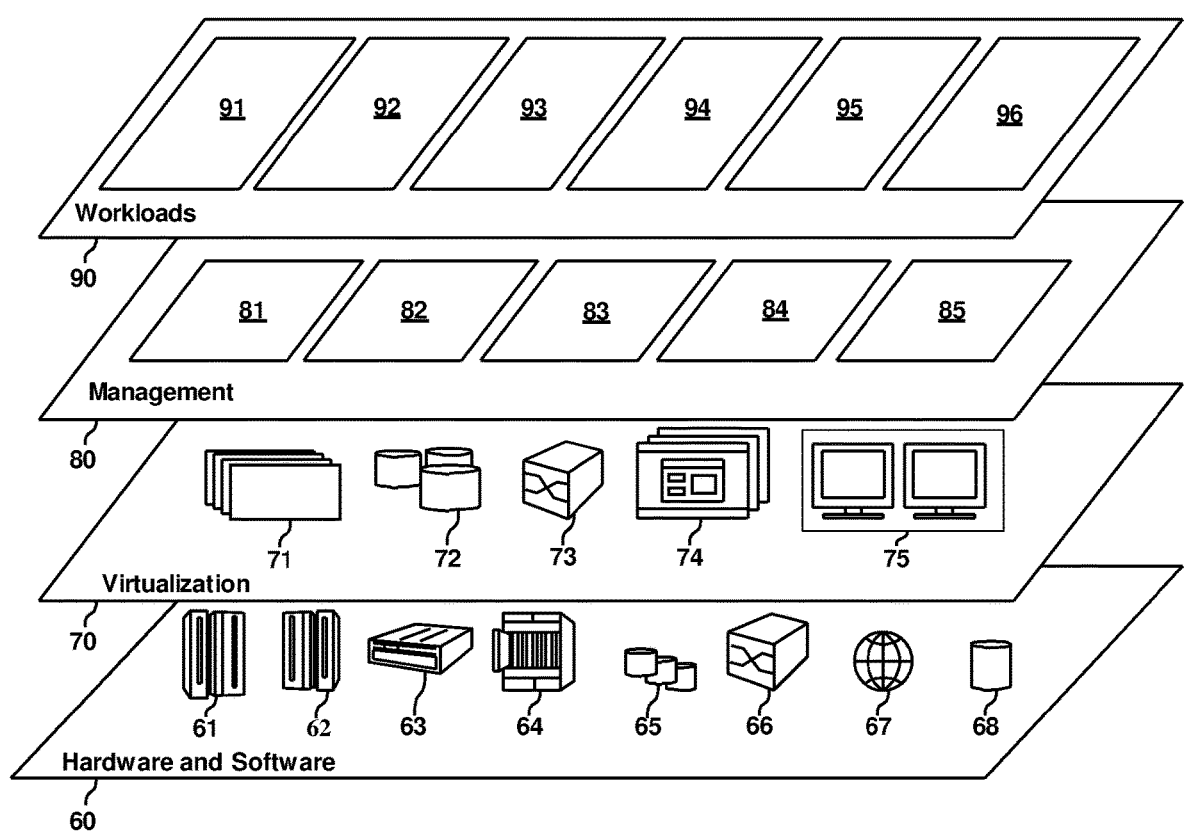
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital twin usage 96.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    creating a digital twin that represents a computing infrastructure, the digital twin representing all microcode versions present in components in the computing infrastructure;
    creating a database of a plurality of updates including at least one microcode version update and a corresponding criticality of each of the plurality of updates;
    emulating a first deployment of a first set of one or more of the plurality of updates with the digital twin;
    emulating a second deployment of a second set of one or more of the plurality of updates with the digital twin, wherein the second set has the first set of one or more of the plurality of updates in a different order than the first deployment;
    analyzing the emulations of the first and the second deployments, wherein the analyzing the emulations comprise reviewing historical data of previous update deployments to the computing infrastructure and impacts of the previous update deployments on the computing infrastructure;
    determining that the second deployment is better than the first deployment; and
    deploying the second set to the computing infrastructure according to the second deployment.

2. The method of claim 1, further comprising:
deploying the first set to the computing infrastructure according to the first deployment.

3. The method of claim 2, further comprising:
recording the deployment of the first set to the computing infrastructure on a historical database.

4. The method of claim 2, wherein the emulation of the first deployment is performed as training.

5. The method of claim 1, wherein at least one of the plurality of updates is optional.

6. The method of claim 1, further comprising:
emulating a third deployment of a third set of one or more of the plurality of updates with the digital twin, wherein an optional update that is present in the first set is absent from the third set.

7. The method of claim 1, further comprising:
emulating a fourth deployment of a fourth set of one or more of the plurality of updates with the digital twin, wherein a first update in the first set is absent from the fourth set, and the fourth set includes an alternate update that is absent from the first set.

8. The method of claim 1, further comprising: in response to analyzing the emulation of the first deployment, determining that the emulation of the first deployment was successful.

9. A computing environment comprising:
a computing infrastructure including microcode;
a digital twin that reflects the computing infrastructure and the microcode in real-time; and
a dashboard configured to display information about the computing infrastructure and the microcode in real-time, wherein:
the dashboard comprises a processor configured to run emulation software for simulating update deployments using the digital twin; and
the dashboard includes a dynamic visual representation of the computing infrastructure including a line of communication between components in the computing infrastructure;
wherein the emulation software running on the processor simulates the update deployments using the digital twin by:
creating a digital twin that represents a computing infrastructure, the digital twin representating all microcode versions present in components in the computing infrastructure;
creating a database of the plurality of updates including at least one microcode version update and a corresponding criticality of each set of the plurality of updates;
emulating, a first deployment of a first set of one or more of the plurality of updates with the digital twin;
emulating a second deployment of a second set of one or more of the plurality of updates with the digital twin, wherein the second set has the first set of one or more of the plurality of updates in a different order than the first deployment;
analyzing the emulations of the first and the second deployments, wherein the analyzing the emulations comprise reviewing historical data of previous update deployments to the computing infrastructure and impacts of the previous update deployments on the computing infrastructure;
determining that the second deployment is better than the first deployment; and
deploying the second set to the computing infrastructure according to the second deployment.

10. The computing environment of claim 9, wherein the dashboard comprises:
a historical database that includes update tickets that reflect previous update deployments.

11. The computing environment of claim 9, wherein the information about the computing infrastructure and microcode comprises:
information about the line of communication between components in the computing infrastructure that is displayed using colors.

12. The computing environment of claim 9, wherein the information about the computing infrastructure and microcode comprises proposed update deployment information for a proposed update deployment.

13. The computing environment of claim 12, wherein the proposed update deployment information includes
a risk factor regarding the proposed update deployment.

14. The computing environment of claim 13, wherein the proposed update deployment information comprises the list of deferred updates that are absent from an order of deployment, and at least one of the deferred updates is an optional update.

15. The computing environment of claim 9, wherein the information about the computing infrastructure and microcode is selected from the group consisting of: power and usage thereof, temperature and cooling, a risk level of performing the update deployment, an estimated full-time equivalent (FTE), an estimated change window time, a status/progress of an update, a best date/time to deploy the update, a rolling update path, a risk level of deferring the update, and the backout plan to rollback the update.

16. A computer program product for memory management, the computer program product comprising a computer readable storage medium, the computer readable storage medium having program instructions embodied therewith, the programs instructions configured, when executed by at least one computer, to cause the at least one computer to perform a method comprising:
creating a digital twin that represents a computing infrastructure, the digital twin representing all microcode versions present in components in the computing infrastructure;
creating a database of a plurality of updates including at least one microcode version update and a corresponding criticality of each of the plurality of updates;
emulating a first deployment of a first set of one or more of the plurality of updates with the digital twin;
emulating a second deployment of a second set of one or more of the plurality of updates with the digital twin, wherein the second set has the first set of one or more of the plurality of updates in a different order than the first deployment;
analyzing the emulations of the first and the second deployments, wherein the analyzing the emulations comprise reviewing historical data of previous update deployments of the computing infrastructure;
determining that the second deplyment is better than the first deployment; and
deploying the second set to the computing infrastructure according to the second deployment.

17. The computer program product of claim 16, wherein at least one of the plurality of updates is optional.

* * * * *